July 1, 1969 — J. J. FESCO — 3,452,520

VACUUM CLEANER FILTER BAGS

Filed May 25, 1967 — Sheet 1 of 2

INVENTOR.
JOHN J. FESCO
BY Friedman & Goodman
ATTORNEYS

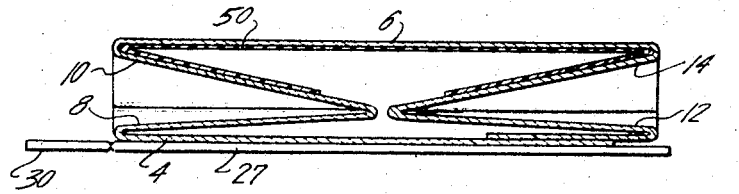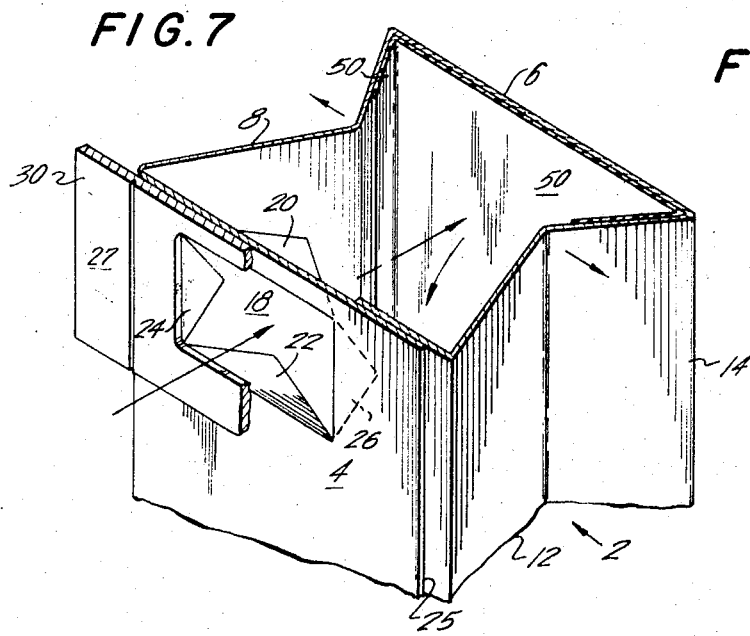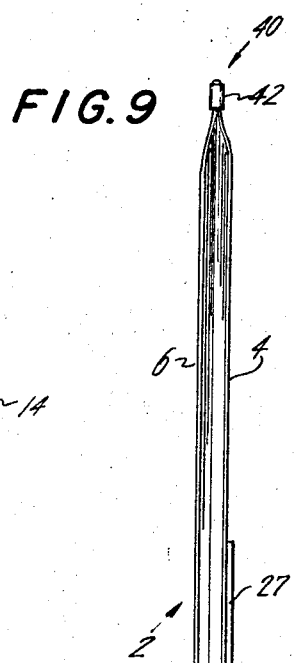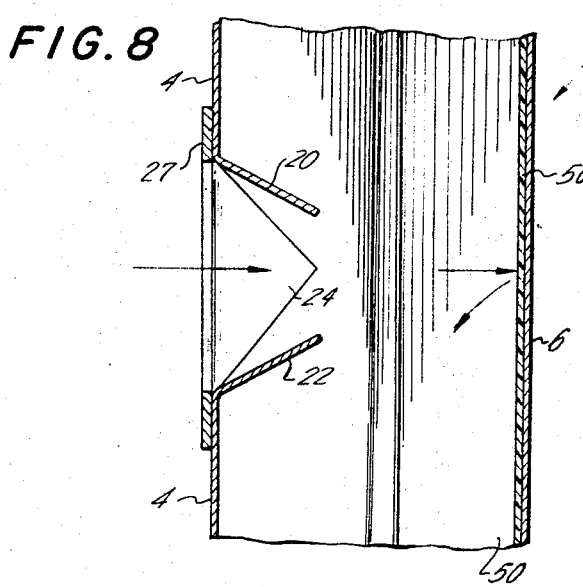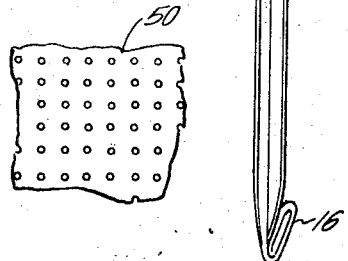

United States Patent Office 3,452,520
Patented July 1, 1969

3,452,520
VACUUM CLEANER FILTER BAGS
John J. Fesco, Baldwin, N.Y., assignor to Studley Paper Company, Inc., Far Rockaway, N.Y., a corporation of New York
Filed May 25, 1967, Ser. No. 641,243
Int. Cl. B01d 29/18, 29/14
U.S. Cl. 55—367      1 Claim

ABSTRACT OF THE DISCLOSURE

This invention and this disclosure are directed to an improved vacuum cleaner filter bag. More particularly, this invention and this disclosure are directed to an improved vacuum cleaner filter bag having the air intake port and collar opposite and facing a wall of the bag. This invention resides in a vacuum cleaner filter bag provided with a continuous film or sheet of polyethylene terephthalate disposed opposite the air intake port and preferably running through the entire length and width of the wall of the bag opposite the air intake port.

BACKGROUND OF THE INVENTION

Field of the invention

This invention resides in the vacuum cleaner filter bag art. More particularly, it is directed to an improvement in bags having a bag wall opposite the air intake port. This invention is particularly concerned with the reinforcement of the bag to prevent ripping of the bag when a stone is sucked against the wall opposite the air intake port.

DISCUSSION OF THE PRIOR ART

Several different vacuum cleaner bags havs a continuous bag wall disposed opposite and facing the air intake uous part of the bag, i.e., the bag wall is on one side and the air intake port on the other but due to gusseted sides of the bag, the port and bag wall are in facing relationship. When these bags, normally constructed of an air pervious paper, are first employed in a vacuuming operation, there is a danger that the entire bag wall opposite the air intake port will rip due to the impingement thereagainst of some hard object. This danger is more acute when the bag is fresh. It such cases should the vacuum suck up a stone before the bag becomes distended, the stone is propelled against the bag wall with sufficient force to cause the same to break rendering the bag useless.

SUMMARY OF THE INVENTION

Objects of the invention

It is an object of this invention, therefore, to provide a vacuum cleaner filter bag with the air intake port disposed opposite but in facing relationship to a continuous bag wall of the bag body.

It is another object of this invention, therefore, to provide such a vacuum cleaner filter bag wherein the bag wall opposite the air intake port is resistant to the forces exerted thereagainst due to entrainment in the air stream of hard dense particles.

It is still another object of this invention, therefore, to provide such a vacuum cleaner filter bag wherein the bag wall is reinforced by a durable, puncture-resistant material.

It is still another object of this invention to provide a vacuum cleaner filter bag which although constructed of paper or other light-weight material can be re-used.

These and other objects of this invention will become apparent from the following complete description of the invention, accompanying drawings and appended claims.

STATEMENT OF THE INVENTION

Broadly, this invention contemplates an improvement in a vacuum cleaner filter bag constructed of an air pervious material, said bag having an air intake port opposite a bag body wall. The improvement resides in a continuous sheet of polyethylene terephthalate disposed opposite the air intake port, between the air intake port and the bag body wall.

In a particularly desirable embodiment, this invention contemplates a vacuum cleaner filter bag comprising a bag body having side gussets, an end fold, an air intake port about which is secured a vacuum cleaner filter bag collar, said air intake port disposed on the side of a bag body wall parallel to the opposite bag body wall, said opposite bag body wall provided with a continuous inside covering of polyethylene terephthalate film.

In still another even more preferred embodiment, this invention contemplates such a vacuum cleaner filter bag wherein the continuous film of polyethylene terephthalate overlaps the gusset folds on either side of the opposite bag body wall.

In another phase of this invention there is contemplated a vacuum cleaner filter bag having an openable and closable end opposite the end fold, said end provided with a stiff bendable material laminated against a bag wall and having laterally extending tabs whereby said bag can be closed by folding the bag walls over together against one bag wall and folding over the resulting fold, said laterally extending tabs.

BRIEF DESCRIPTION OF THE DRAWINGS

This invention can be more readily understood and appreciated when reference is had to the accompanying drawings, in which:

FIGURE 6 is a sectional elevation taken along the line 6—6 of FIGURE 5;

FIGURE 7 is a perspective view partially broken away of a sectional view taken along line 7—7 of FIGURE 5;

FIGURE 8 is a sectional view taken along the line 8—8 of FIGURE 5 with the bag open as in FIGURE 7;

FIGURE 9 is a side elevational view of the bag as shown in FIGURE 5; and

FIGURE 10 is a view of a polyethylene terephthalate interior wall provided with perforations pursuant to a preferred embodiment of this invention. The balance of the bag is broken away.

DESCRIPTION OF THE PREFERRED EMBODIMENTS

Figure 1:
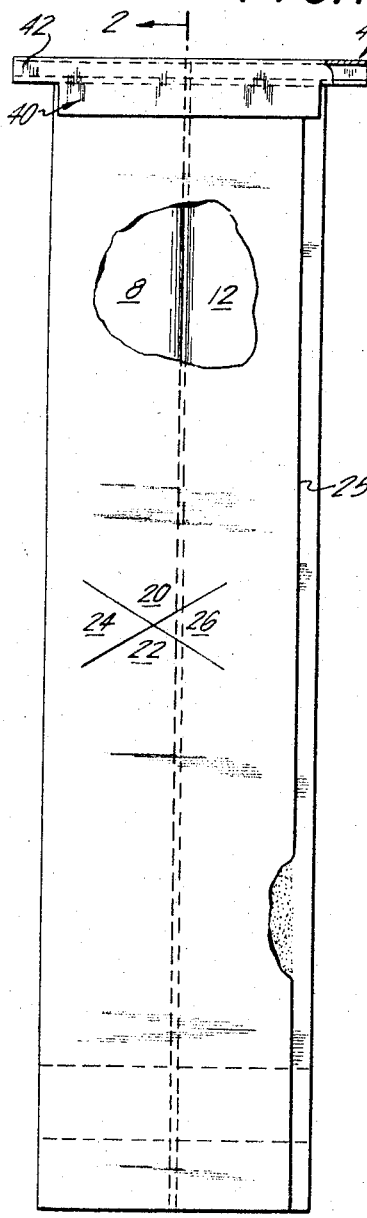
FIGURE 1 is a frontal elevation of the vacuum cleaner filter bag of this invention with the collar removed to facilitate understanding of the invention. The drawing is partially broken away so that the layer of polyethylene terephthalate is visible.
Figure 2:
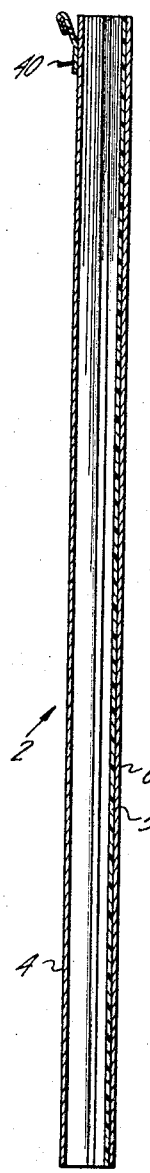
FIGURE 2 is a sectional elevation taken along the line 2—2 of FIGURE 1.

Pursuant to the present invention there is provided a bag 2 having a first bag wall 4 and a second bag walll 6, which walls are joined together on one side by pleat panels 8 and 10 and on the other side by pleat panels 12 and 14. At one end of the bag there is provided an end fold 16 fixing the bag walls 4 and 6 together. A portion of one bag wall, suitably wall 4, has an air inlet port 18 provided therein which air inlet port is defined by four triangularly shaped inwardly bending port panels 20, 22, 24 and 26. Overlying and surrounding air inlet port 18 is a collar 27 having a rectangularly shaped cutout 28 in registry with air inlet port 18. The collar 27 is suitably glued or stapled to the bag wall 4 or secured by other appropriate means. The collar is provided with an integral tab portion 30 to facilitate handling the entire bag. The walls 4 and 6 are secured longitudinally along glue line 25.

Figure 5:
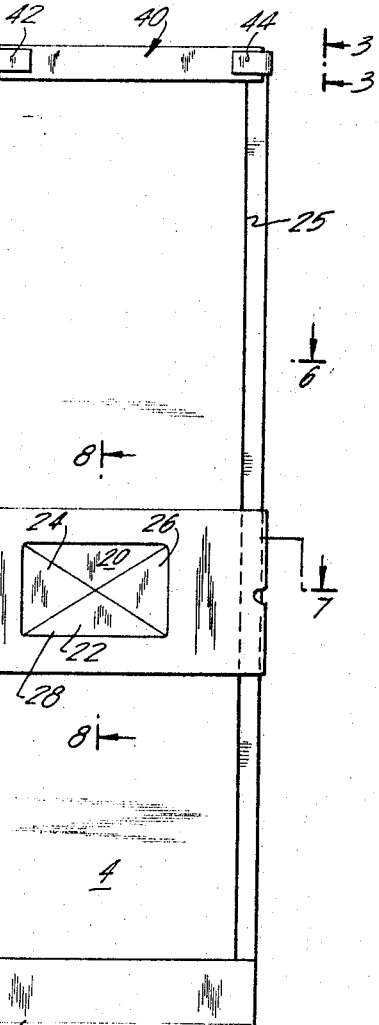
FIGURE 5 is a frontal elevation of a finished vacuum cleaner filter bag with the upper end closed, the collar in place and the end fold completed. The figure is partially broken away.

At the end of the bag opposite the end fold 16 on either bag wall 4 or 6 there is provided a laminated piece 40 running across the width of the bag at this upper extremity of the bag wall. The piece 40 is a stiff material which terminates on either side into stiff bendable tabs 42 and 44. The stiff bondable material is suitably a plastic paper or cloth material covering a flat bendable metal material 46. The bag is folded over upon itself with bag surface contacting bag surface. The still bendable tabs are folded over the resultant fold inwardly to define an enclosed bag. The result is that the laminated piece is exposed as seen in FIGURE 5.

The bag wall opposite the air inlet port 18 has an interior lining 50 opposite the port 18 of polyethylene terephthalate film of a thickness between about .0025 and .003 inch, preferably at least .001 inch. In a particularly desirable embodiment, the polyethylene terephthalate film extends the entire length of bag wall and along a portion of the inside pleat walls 10 and 14 as seen in FIGURE 6 and FIGURE 7. In a still more desirable embodiment of the invention, the polyethylene terephthalate continuous film is provided with a multiplicity of perforations having a small enough diameter to prevent escape of dirt, etc., through the perforations but to allow passage of air therethrough.

By providing this continuous polyethylene terephthalate film, stones or other abrasive and dense material taken into the bag during operation are deflected in accordance with the arrows shown in FIGURE 7 and FIGURE 8. This film is puncture-resistant and durable and as such prevents the ripping open or tearing of the bag due to impingement against the normally paper surface of a puncturing material. The provision of small perforations in the polyethylene enables the use of this material effectively without decreasing the available area for escape of the filtered air. In addition, the provision of a continuous polyethylene terephthalate film along the interior sides of the pleat walls 10 and 14 provides increased support of the bag body at the edge where these side pleat walls meet the bag wall 6. Thus when a single polyethylene terephthalate sheet is employed lining these walls and bag wall 6 the chance of puncture or tear of the bag is remote. The utilization of this particular material is extremely important in accordance with this invention as many other synthetic resinous films or sheets are unsuitable as a bag wall interior support. This material while functioning ideally as a wall reinforcement and guard has a high degree of flexibility which makes it ideal in the construction of the bag and the use of the same. No substantial handling requirements are imposed by the use of this material as would be true for coarser materials and the like. The material functions well at the thin film or sheet sizes set forth above.

Figures 3, 4:
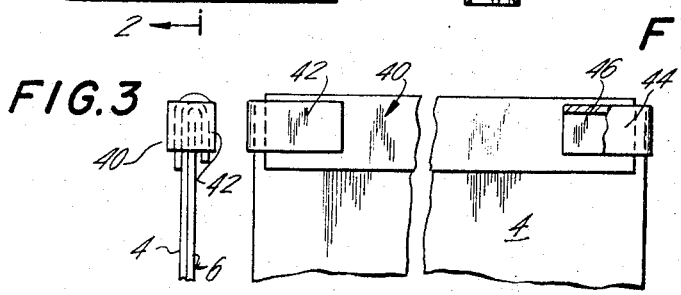
FIGURE 3 is an enlraged view of a portion of the vacuum cleaner filter bag as seen by looking at the side of the bag in the direction of the arrow in FIGURE 5.
FIGURE 4 is an enlarged view of the upper portion of the vacuum cleaner filter bag seen in FIGURE 5.

By providing the above described laminated stiff bendable material with projecting tabs, there is provided a reusable bag which can be economically constructed with the aid of standard bag-making machines. The unfolding of the fold is performed merely by bending the infolded tabs 42 and 44 from the position shown in FIGURE 4 to the outwardly extending position depicted in FIGURE 1. The folded walls 4 and 6 are readily unfolded to the position of FIGURE 1, thereby permitting emptying of the caught dust, dirt and other debris, from the vacuum cleaner filter bag.

Since the continuous polyethylene terephthalate film assists in the over-all support of the bag walls in addition to guarding them against puncture, the bag is less worn than bags not containing this film. Thus such a bag is more suited for reuse and functions ideally in combination with the laminated lock fold means. The two cooperate to provide a bag eminently suited for continued re-use. In the case of a bag intended for repeated re-use, it is desirable that the collar 27 be constructed of a suitable durable material such as a sturdy grade of cardboard.

From the foregoing it is seen that the instant invention solves a long standing problem in an inexpensive, simple manner. The instant bags can be constructed with only minor variations in the standard bag-making process. The instant invention provides a vacuum cleaner filter bag of the disposable type having an air intake port disposed opposite but in facing relationship to a continuous bag wall of the bag body. The bag wall is resistant to the forces exerted thereagainst due to entrainment in the air stream of hard, dense, abrasive particles. The instant invention also provides a reusable filter bag constructed of light-weight material, e.g. air porous paper.

What is claimed is:

1. A vacuum cleaner filter bag comprising a generally flat front wall parallel to a generally flat back wall; said front and back walls being joined on both sides to one another by pleated side walls and on one first end by a double end fold; there being disposed at the opposite second end from said end fold an openable and closable end provided with a stiff bendable material laminated against said back wall, said material having laterally extending tabs permitting said bag to be closed by folding the bag walls at said second end over together against one of said front and back walls and folding said laterally extending tabs over the resultant fold at said second end; said bag having a rectangular air inlet port in said front wall and defined by four triangular folding flaps formed in said front wall; a rectangular collar positioned in registry over said air inlet port; said front, back and pleated side walls constructed of an air pervious material; a film of polyethylene terephthalate disposed on said back wall opposite said inlet port; said film extending over the entire width and length of said back wall and along the inside of only a portion of each of said pleated side walls; said film having a thickness of between 0.0025 and 0.003 inch; and said film having a plurality of small perforations therein.

References Cited

UNITED STATES PATENTS

| | | | |
|---|---|---|---|
| 2,574,683 | 11/1951 | Anderson | 55—367 |
| 1,857,010 | 5/1932 | Avery | 229—65 X |
| 2,024,143 | 12/1935 | Cameron | 55 368 |
| 2,030,634 | 2/1936 | Holloway | 229—65 X |
| 2,108,741 | 2/1938 | Betner | 229—65 |
| 2,178,044 | 10/1939 | Le Vesconte et al. | 229—65 |
| 2,188,428 | 1/1940 | Evans | 55—381 X |
| 2,216,133 | 10/1940 | Potdevin et al. | 229—65 |
| 2,237,499 | 4/1941 | Osterdahl | 55—376 |
| 2,577,863 | 12/1951 | Sosnowich | 55—376 |
| 2,732,911 | 1/1956 | Gall | 55—368 |
| 2,792,076 | 5/1957 | Meyerhoefer | 55—368 X |
| 2,848,062 | 8/1958 | Meyerhoefer | 55—382 X |
| 2,855,137 | 10/1958 | Simonsen | 229—65 |
| 2,975,862 | 3/1961 | Goldberg | 229—62.5 X |
| 2,995,205 | 8/1961 | Cordell | 55—381 |

(Other references on following page)

UNITED STATES PATENTS

| | | | |
|---|---|---|---|
| 3,191,365 | 6/1965 | Feeley | 55—369 |
| 3,203,551 | 8/1965 | Van Loan | 210—486 |
| 3,209,523 | 10/1965 | Smithson | 55—374 |

FOREIGN PATENTS

| | | |
|---|---|---|
| 58,471 | 3/1944 | Denmark. |
| 1,021,076 | 2/1966 | Great Britain. |

HARRY B. THORNTON, *Primary Examiner.*

DENNIS E. TALBERT, Jr., *Assistant Examiner.*

U.S. Cl. X.R.

55—368, 376, 378, 382; 229—62.5, 65